(12) United States Patent
Hein

(10) Patent No.: US 8,108,183 B2
(45) Date of Patent: Jan. 31, 2012

(54) SYSTEM AND METHOD FOR LOAD TESTING A WEB-BASED APPLICATION

(76) Inventor: Henri Hein, Boulder Creek, CA (US)

( * ) Notice: Subject to any disclaimer, the term of this patent is extended or adjusted under 35 U.S.C. 154(b) by 0 days.

(21) Appl. No.: 11/121,950

(22) Filed: May 4, 2005

(65) Prior Publication Data

US 2006/0265190 A1    Nov. 23, 2006

(51) Int. Cl.
  *G06F 11/30* (2006.01)
  *G21C 17/00* (2006.01)
(52) U.S. Cl. .................................................. 702/186
(58) Field of Classification Search .............. 702/186, 702/119, 122, 182; 714/25, 38, 47; 709/223, 709/224
  See application file for complete search history.

(56) References Cited

U.S. PATENT DOCUMENTS

| | | |
|---|---|---|
| 5,870,559 A | 2/1999 | Leshem et al. |
| 6,167,534 A | 12/2000 | Straathof et al. |
| 6,434,513 B1 | 8/2002 | Sherman et al. |
| 6,477,483 B1 | 11/2002 | Scarlat et al. |
| 6,522,995 B1 | 2/2003 | Conti et al. |
| 6,735,719 B2 | 5/2004 | Moe et al. |
| 6,754,701 B1 | 6/2004 | Kessner |
| 7,089,246 B1 * | 8/2006 | O'Laughlen ............... 726/4 |
| 7,231,606 B2 * | 6/2007 | Miller et al. .............. 715/738 |
| 7,499,996 B1 * | 3/2009 | Buchheit et al. ......... 709/224 |
| 2003/0074606 A1 | 4/2003 | Boker |
| 2004/0078684 A1 | 4/2004 | Friedman et al. |
| 2004/0123148 A1 * | 6/2004 | Offermann .............. 713/201 |
| 2009/0043798 A1 * | 2/2009 | Tan et al. ................ 707/102 |

OTHER PUBLICATIONS

"URL", NetLingo Dictionary, printed Feb. 28, 2011.*

* cited by examiner

*Primary Examiner* — Michael Nghiem
(74) *Attorney, Agent, or Firm* — Michael A. Guth

(57) ABSTRACT

A computer-based method for load testing a web application. The computer-based method includes selecting one or more uniform resource locator (URL) parameters, identifying the selected parameters by parameter type, and loading the web application with URLs created by randomly generating the selected URL parameters. An electronic system adapted to load test a web application utilizing random parameter generation.

3 Claims, 15 Drawing Sheets

SYSTEM AND METHOD FOR LOAD TESTING A WEB-BASED APPLICATION

BACKGROUND

1. Field of the Invention

This invention relates to the load testing of web applications, and more specifically to the load testing of web applications using random parameter generation.

2. Description of Related Art

Communication of data over the Internet, or over other wide area or local area networks, to entities referred to as clients, is accomplished by a web application interconnected via a communication system to the clients. The specific resource requirements upon the web application for processing a client's request for data depend upon the nature of the data. The total load on the web application increases with the number of clients accessing the web application and, with a large number of clients, may exceed the operation capacity of the web application in terms of meeting performance goals. Such performance may be measured in transactions per second (TPS), and average response time, which are examples of client oriented performance parameters, and number of clients being served, and CPU utilization, which are examples of server oriented performance parameters.

A load test generally involves simulating the actions of relatively larger numbers of users to determine how the application or transactional server will perform under heavy loads. During the development and testing of a web-based application, the application may be loaded to assess its performance. To conduct such an assessment of a web application, systems known as load generators have been developed to simulate the load generated by clients upon the web application. Load generators may also be used to generate load to put an application under stress while troubleshooting an identified problem with the application, and for other reasons.

Often load tests need to be run during the development of a web-based application, and often to test only a portion of the application. Many prior load testing scenarios utilize user logs to generate test scripts for the loading of applications. A significant drawback of methods utilizing user logs or other tracking of past use of a web-based application is that no such logs are available for a yet unused application. Another drawback of such methods is that the tester may choose to significantly load a portion of an application for a particular reason, including troubleshooting, in a way not reflected in any user logs even if the user logs for the application do exist.

SUMMARY

A computer-based method for load testing a web application. The lightweight computer-based method allows for selection and load testing of URLs accessed by web browsers running on the system. The computer-based method comprises selecting one or more uniform resource locator (URL) parameters, identifying the selected parameters by parameter type, and loading the web application with URLs created by randomly generating the selected URL parameters.

An electronic system adapted to load test a web application utilizing URL selection and random parameter generation in a lightweight fashion and without the need of or use of scripts.

DETAILED DESCRIPTION

Figure 1:
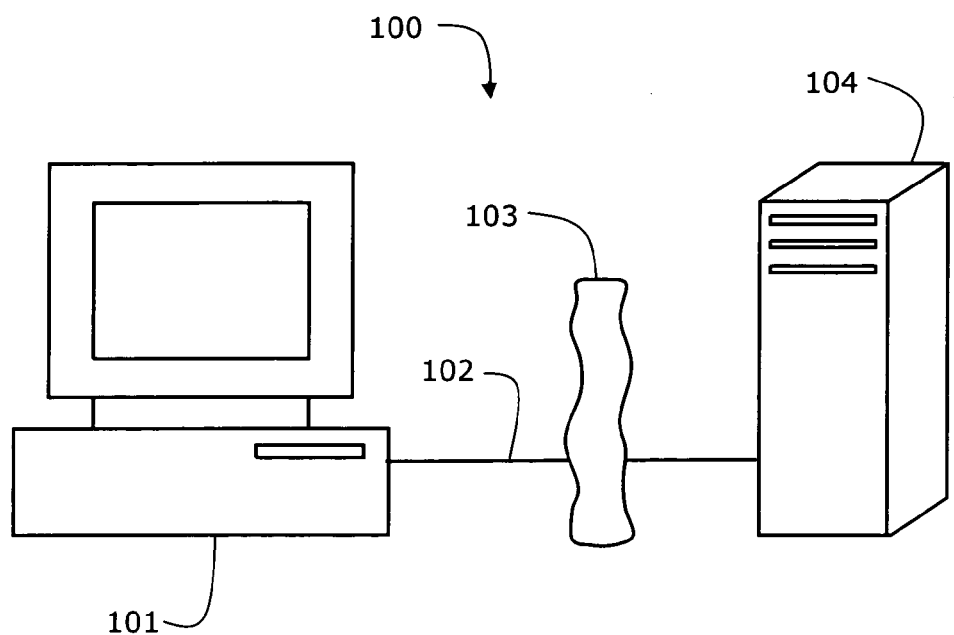
FIG. 1 is an illustration of a load testing system according to some embodiments of the present invention.

FIG. 1 illustrates the primary components of a load testing system 100 which provides various functions and services for the load testing of target systems. For purposes of illustration, the load testing system 100 will be described primarily in the context of the testing of websites and web-based applications. In some embodiments, a load testing application resides in the memory of the host computer 101. In some embodiments, a load testing application resides in a computer readable medium accessed and read by the host computer 101. In some embodiments, the host computer 101 is a personal computer. The host computer 101 is communicatively linked to a first electronic platform 104 via a communication link 102. In some embodiments, the communication link 102 is a local area network. In some embodiments, the communication link includes transmission across a global-area communication network 103, such as the internet. In some embodiments, a web-based application resides upon the first electronic platform 104. In some embodiments, the electronic platform 104 is a server. In some embodiments, the web-based application resides upon a plurality of electronic platforms.

The load testing application is a lightweight application for the load testing of web-based applications allowing for selection of URLs from URLs accessed by one or more web browsers running on the host computer without the use of scripts. In some embodiments, the load testing application allows for the selection of URL parameters and other items whose values can be modified for the creation of templates used in the load testing of a web-based application. The load testing application allows for the sequential creation and sending of URLs to a web-based application without the use of scripts. In some embodiments, the functionalities of the load testing application will be implemented using a host computer.

In some embodiments, the load testing application is operated by the tester using a host computer using a number of graphical user interfaces or dialog boxes that allow for the selection and implementation of the functionalities of the load testing application. Conceptually, the load testing application can be separated into user-interface, or setup, portion, and a run-time portion. The setup portion of the load testing application involves identification and selection of URLs to be used during load testing, and the identification of URL parameters within these URLs which can be varied and used to load a web-based application. The setup portion also involves the selection of configuration parameters for the tests run by the load testing application. The run-time portion of the load testing application generates test URLs that are used to load a web-based application, and then is able to load a web-based application in real time using these test URLs. The run-time portion also stores data from the load testing that can be accessed later for review.

Figure 2A:
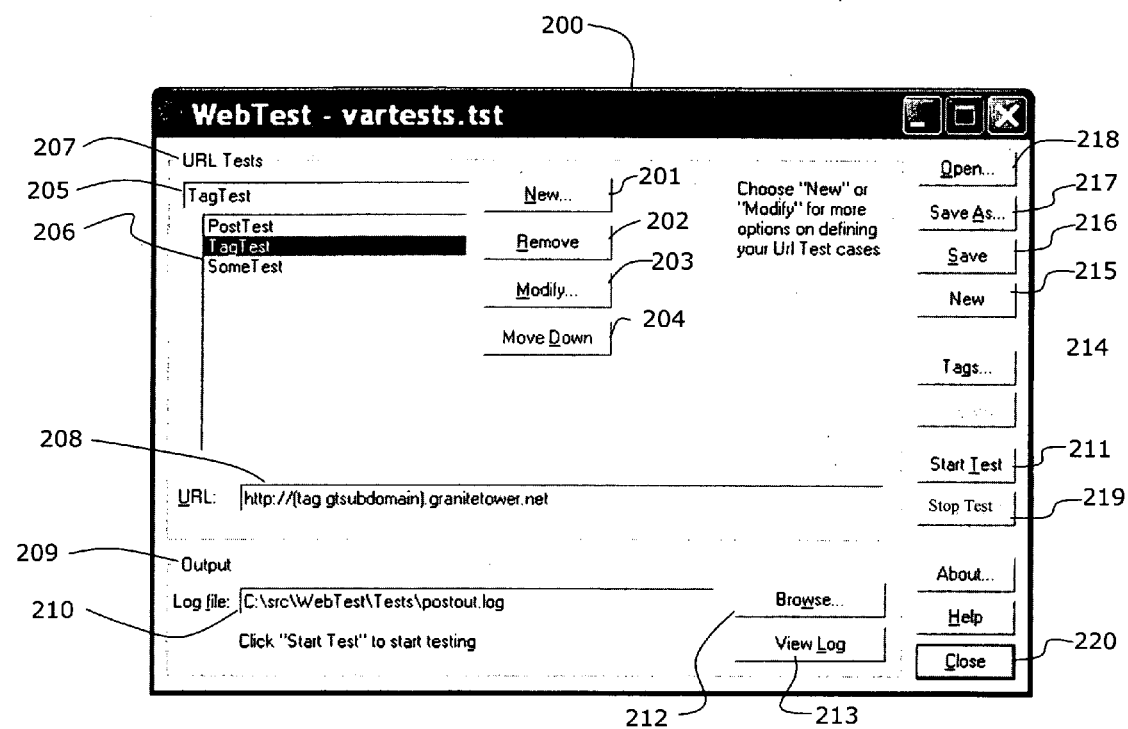
FIG. 2A is a view of a dialog box from a load testing application with sample entries according to some embodiments of the present invention.
Figure 2B:
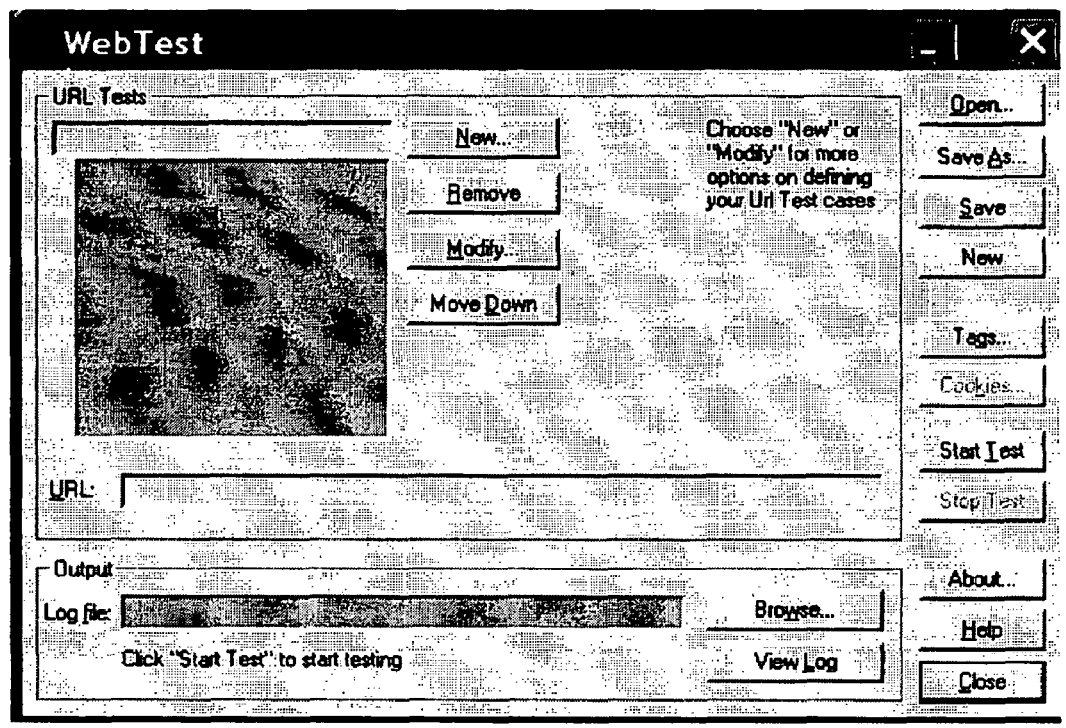
FIG. 2B is a view of a blank dialog box from a load testing application according to some embodiments of the present invention

FIGS. 2A-B illustrate the opening screen WebTest dialog box 200 of the load testing application according to one embodiment of the present invention. The URL Tests box 207 allows for the creation of and display of templates used in the running of a load test. The tests box 206 displays the list of selected templates to be run in the load test. One or more templates may run during a load test. To create a new template, the New button 201 is pushed. To remove a template from the list, the Remove button 202 is pushed. To modify a template, the Modify button 203 is pushed. To move a template to lower position in the list, which then alters the sequence of URL generation, the Move Down button 204 is pushed. Once one or more templates has been selected, modified, or created, the load test configuration may be saved using the Save 216 or Save As 217 buttons. To load an existing load test configuration, previously saved load test configurations may be accessed using the Open button 218. When creating a new load test configuration from scratch, the New button 215 is pushed to create the first template.

When a particular template 205 is highlighted in the tests box 206, the URL template for the highlighted template is displayed in the URL box 208. In some embodiments when running a load test with a number of templates running, the first template listed will generate the first URL which is then sent to the web-based application under load, then the second template will generate the second URL, and so forth, until the last template in the list has generated a URL and sent it to the web-based application. The process will then repeat itself. If one template is configured to be run a fewer number of cycles than the others, this template will have run its course and will be removed from this cyclical process. The load test is a lightweight test that does not require the generation of scripts, or the compilation of any code.

The Output box 209 displays and allows for selection of the log file 210 wherein the test data for the load test will be saved. The Browse button 212 allows the tester to browse a file directory from which to select a log file. The View Log button 213 allows the tester to view the log file from a load test. In some embodiments, the log file 210 will keep a record of the actual URL sent at each step of the load test, the http status code returned, and the length of time until the return. In some cases a time out will occur for a particular URL generation before the return of data.

To start a test after all the configurations and parameters have been sent, the Start Test button 211 is pushed. To stop a test that is in progress, the Stop Test button 219 is pushed. To close the load testing application, the Close button 220 is pushed.

Figure 3A:
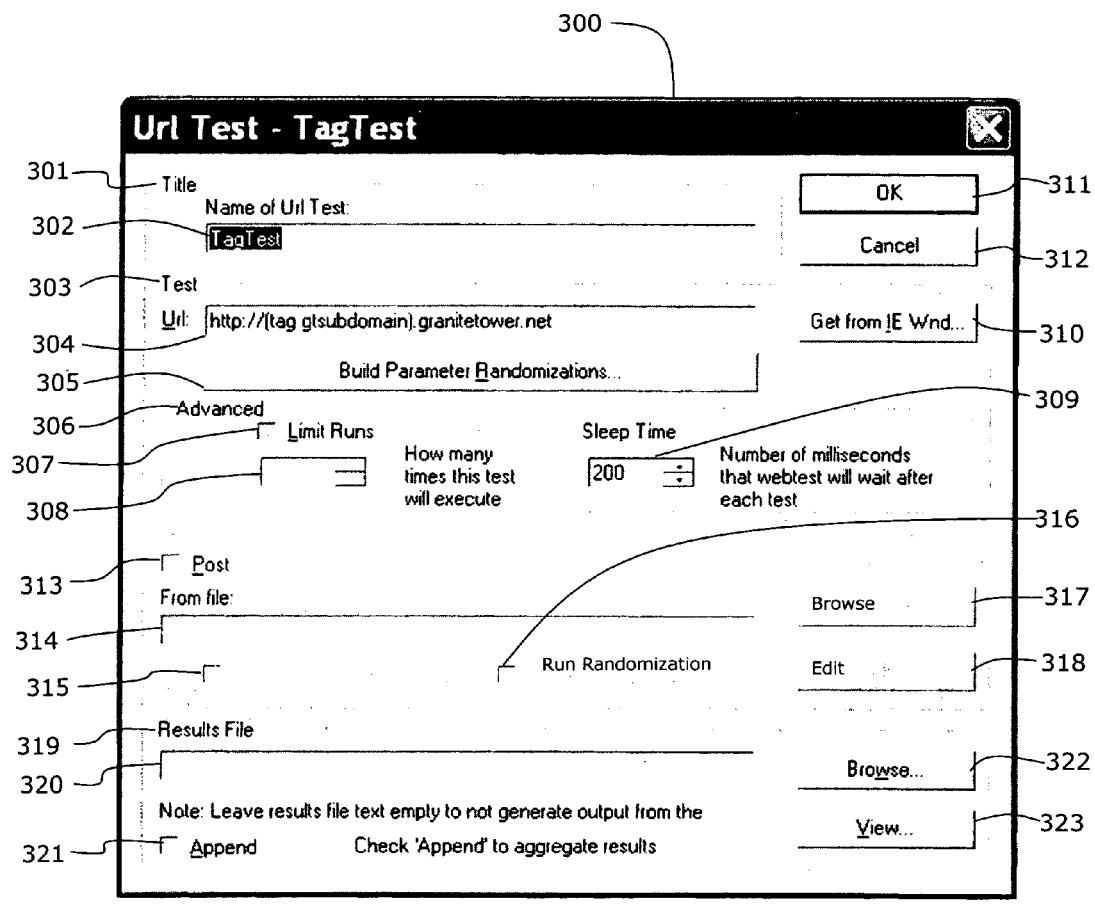
FIG. 3A is a view of a dialog box from a load testing application with sample entries according to some embodiments of the present invention.
Figure 3B:
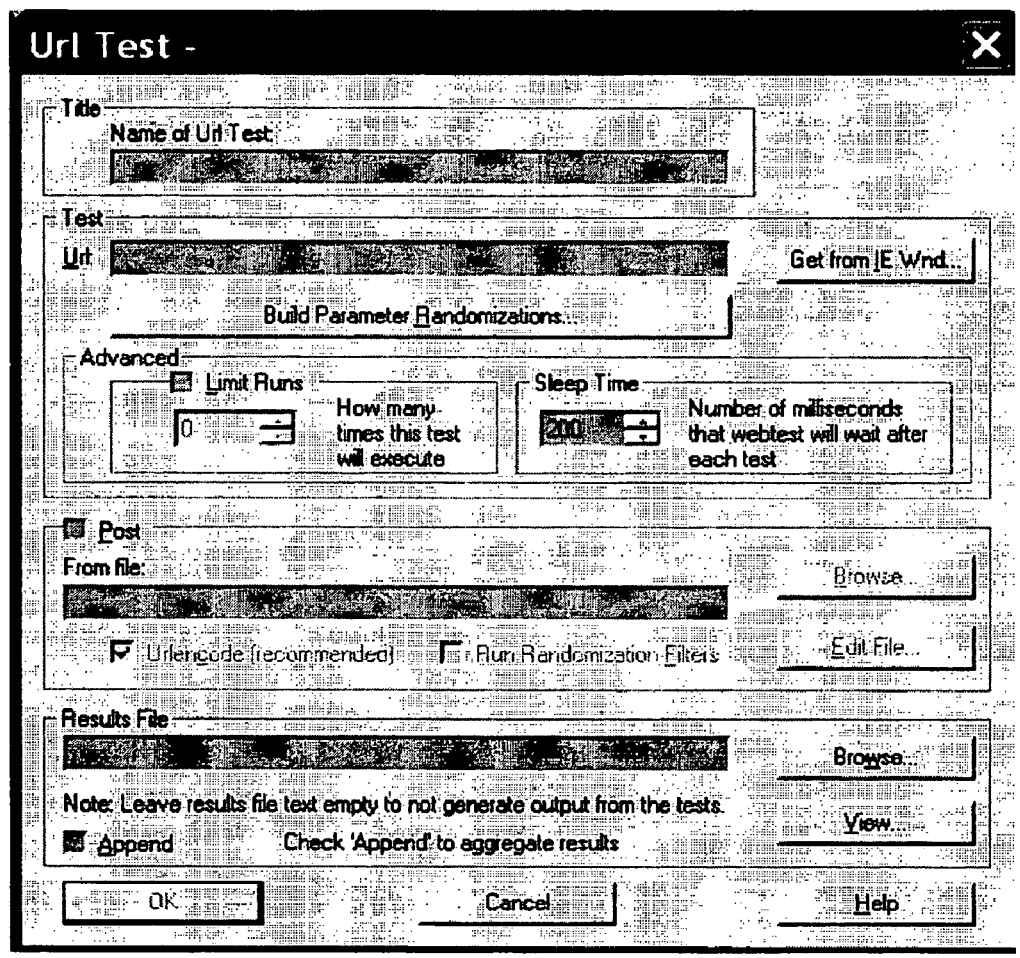
FIG. 3B is a view of a blank dialog box from a load testing application according to some embodiments of the present invention

FIGS. 3A-B is a screen shot of the template generation dialog screen 300. When the New button 201 or the Modify button 202 on the opening screen 200 is pushed, the template generation screen 300 is then displayed. The template generation screen 300 allows for the creation of templates which are used in the load testing of a web-based application. The Title box 301 displays the name 302 of the URL template that is being created or modified. The Test box 303 displays the URL template that is being modified or that has been created in the Url box 304. If the tester knows exactly what the tester wants entered for a URL template, it can be directly entered into the Url box 304. In some embodiments, the URL template is a URL selected from a list of instances accessed by a web browser running on the host computer. In some embodiments, the URL or URLs selected are modified into a template which implements a functionality that varies the URL sent to load the web-based-application. In some embodiments, some or all of the URL parameter values are varied. In some embodiments, the values of the parameters to be varied are randomly generated. In some embodiments, the random generation of a particular parameter value proceeds according to rules set by the user to guide the random generation.

Figure 4:
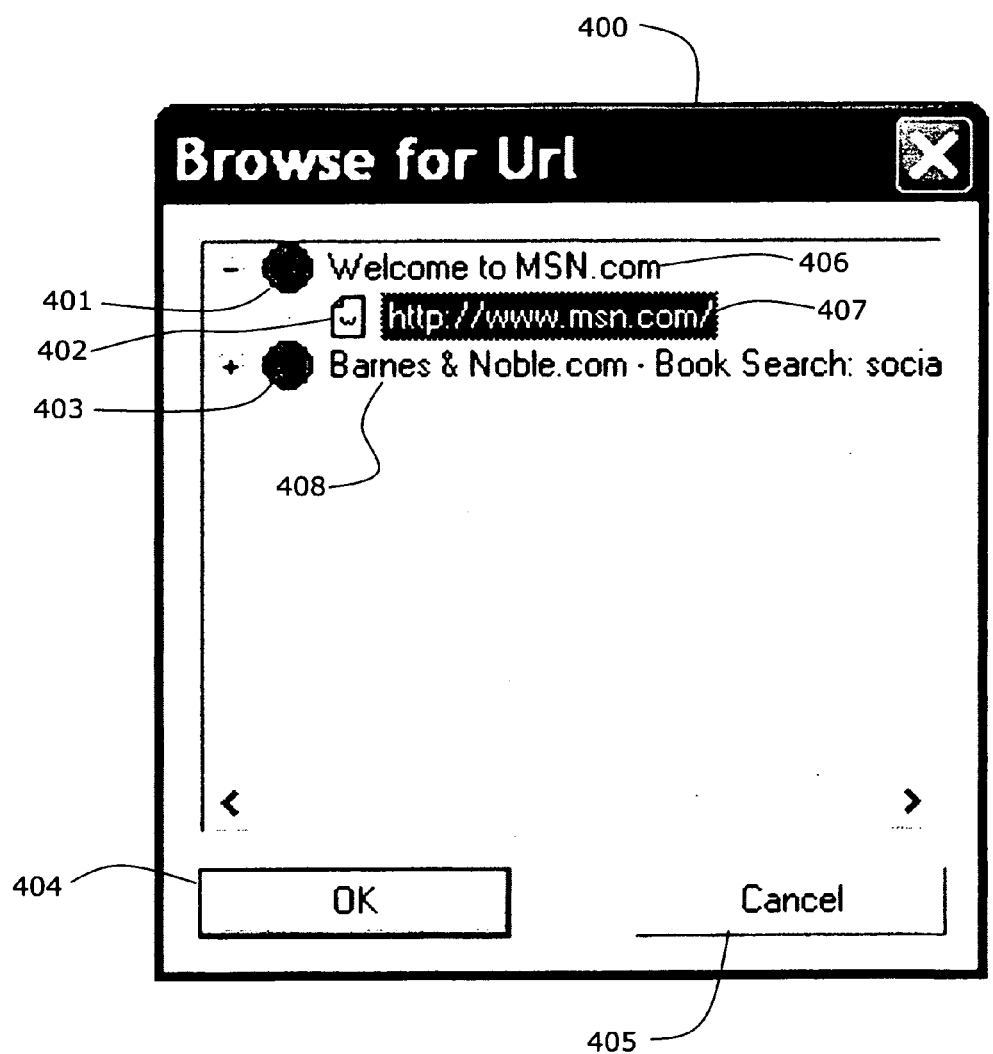
FIG. 4 is a view of a dialog box from a load testing application with sample entries according to some embodiments of the present invention.

The Get button 310 implements a functionality that will access web browsers that are open on the host computer. This functionality enables the user to easily select a URL after calling up the corresponding page on a web browser, such as Internet Explorer. The tester is able to select the URL from the running instances of the web browser. A list of web page instances will be displayed in the Browse for URL dialog box 400, as seen in FIG. 4. The top-level Shell instances 406, 408 may be designated with an icon 401, 403. The web pages displayed in a particular instance 407 may be designated with another icon 402. The particular instance to be selected is highlighted and then selected by pushing the OK button 404.

The process to build the list of top-level and particular instances may be comprised of the following steps, using the web browser as Internet Explorer (IE) in this example. Because of framing and other methods, an IE window may contain multiple web pages. The load testing application connects to the Windows Shell interface. A list of running Shell instances is made. For each Shell instance, a determination is made to see if the Shell instance is an Internet Explorer instance. This is done by checking to see if the Shell instance supports the IWebBrowser2 COM interface. If the COM interface is supported, the load testing application connects to that COM interface. After connection to the COM interface, the title and top level URL is determined for that Shell instance. The IE instance is added to a list of instances. The exposed DOM interface of the Shell instance is then connected to. Using the DOM interface, it is determined if any frames are displayed.

For any Shell instance that has frames displayed, the URL and the title of a frame is determined. This frame is then added to a list of frames for the top level instance. These steps are repeated for each frame within the Shell instance. After all of the frames within the Shell instance are added to the list, the next Shell instance goes through the same process. After all of the Shell instances and frames have been reviewed, all of the COM interfaces are released. The resulting lists are then displayed in the Browse for URL dialog box 400. The selection of URLs to be tested can be done quickly by a tester who browses the pages of a web application that they wish to test.

Figure 5A:
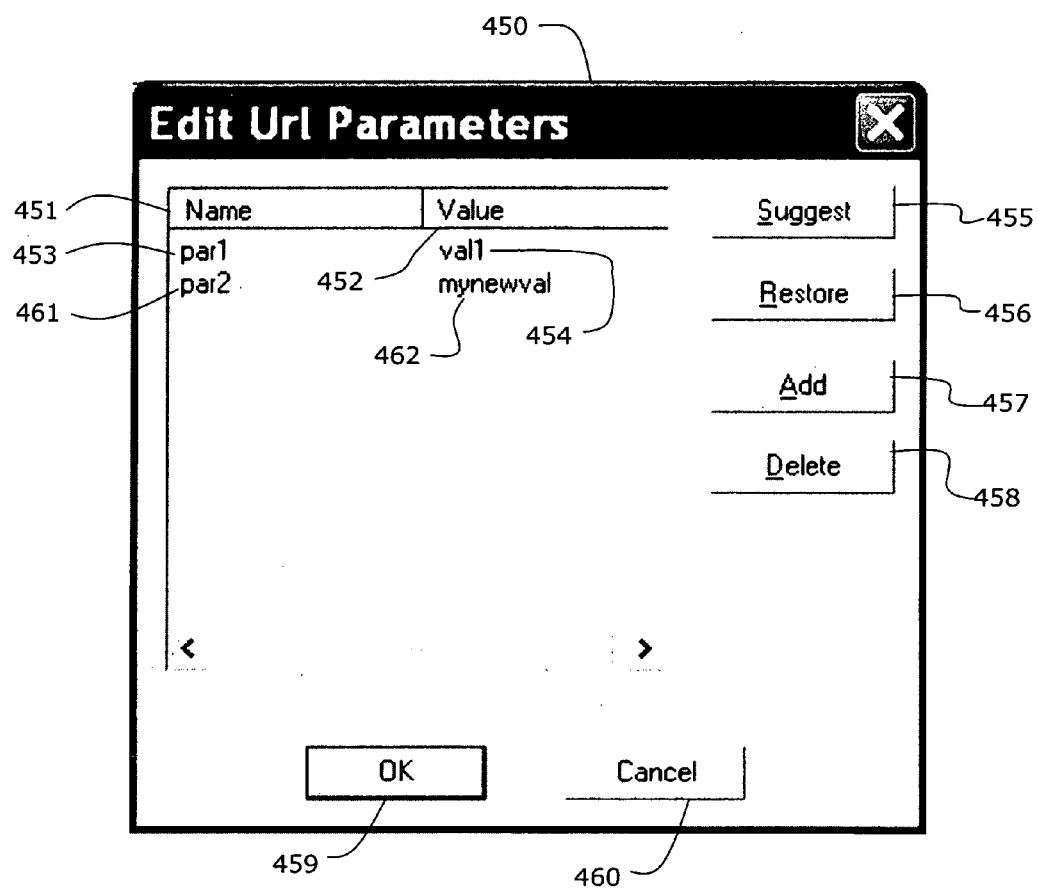
FIG. 5A is a view of a dialog box from a load testing application with sample entries according to some embodiments of the present invention.
Figure 5B:
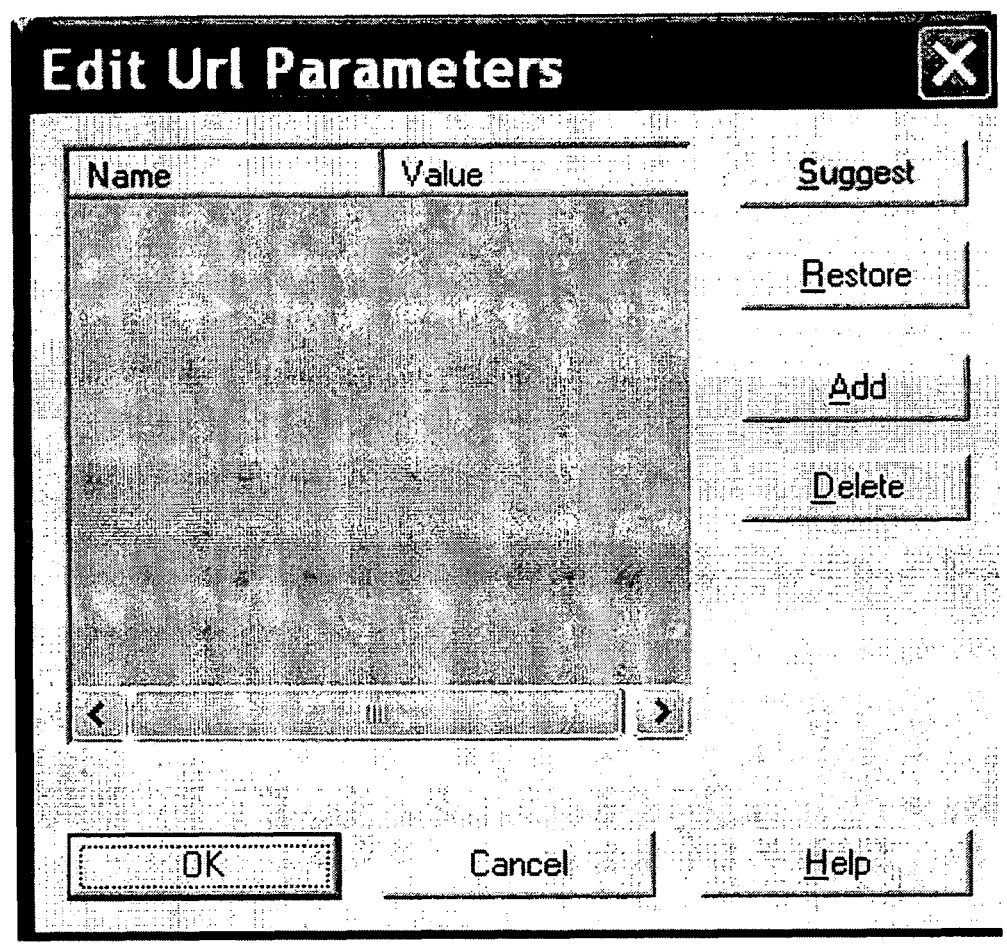
FIG. 5B is a view of a blank dialog box from a load testing application according to some embodiments of the present invention

After selection of a URL from the Browse for URL dialog box 400, which is done by highlighting the URL to be selected and pushing the OK button 404, the tester is returned to the URL Test dialog box 300. To implement the functionality which will generate random values for some or all URL parameter values or parameter names, the Build Parameter Randomizations button 305 is pushed. The load testing application then displays the Edit URL Parameters dialog box 450, as seen in FIGS. 5A-B. The name-value pairs for the selected URL are displayed, with the names 453, 461 in the Name column 451, and their associated values 454, 462 in the value column 452. With the selection of a name or a value, and the pushing of the Suggest button 455, a suggestion is made on how to vary the name or the parameter value. In some embodiments, the name or parameter is evaluated by the load testing application; for example, a four digit number value may be evaluated and the load testing application may suggest that a number from 0000-9999 be randomly generated and substituted in for this parameter value for each iteration of the load testing of the web-based application that uses the template based upon the URL which contains the parameter. A new parameter may be added by pushing the Add button 457. A parameter may be deleted using the Delete button 458.

If the user is not satisfied with the parameter randomization that has been generated, the tester may push the Cancel button 460 and the operation will not be used. In a case where the tester was modifying an earlier set or parameter value randomization choices for a URL, the earlier set will remain in place. This result will also occur if the Restore button 456 is pushed. If an earlier set of randomization choices has not been made for the URL, no randomization will have been selected and the URL, if used in a load test, will be sent each time with the same values as the original URL. If the tester is satisfied with the parameter value randomization that has been generated, the tester may toggle the OK button 459. In either case, the tester is returned to the URL Test dialog box 300.

The Advanced box 306 allows the user to set some template configuration parameters for the selected template 302. The Limit Runs box 307, when selected, allows the tester to set a number 308 of runs that the particular template will cycle. If the Limit Runs box 307 is not selected, the template will not be limited by number of cycles. The Sleep Time box 309 allows for the setting of the number of milliseconds that the test can pause before iterating again. In some test run cases, the tester may want to have a pause before an action repeats, simulating that a tester has waited between certain actions. This functionality may also be used if the server requires a wait time to asynchronously store input into a database.

The Results File box 319 allows for the selection of an output file that will store the returned content. If no file is placed in the file line 320, no data will be saved using this functionality. The Browse button 322 allows for the selection of a file to be used to store the results. The View button 323 allows the tester to view the stored data from the previous run of the template. The Append box 321, if selected, implements a functionality wherein all content returned for each iteration of the test will be saved in the results file. If the Append box 321 is not selected, each content object returned on each cycle overrides the saved data from the previous cycle.

Figure 6A:
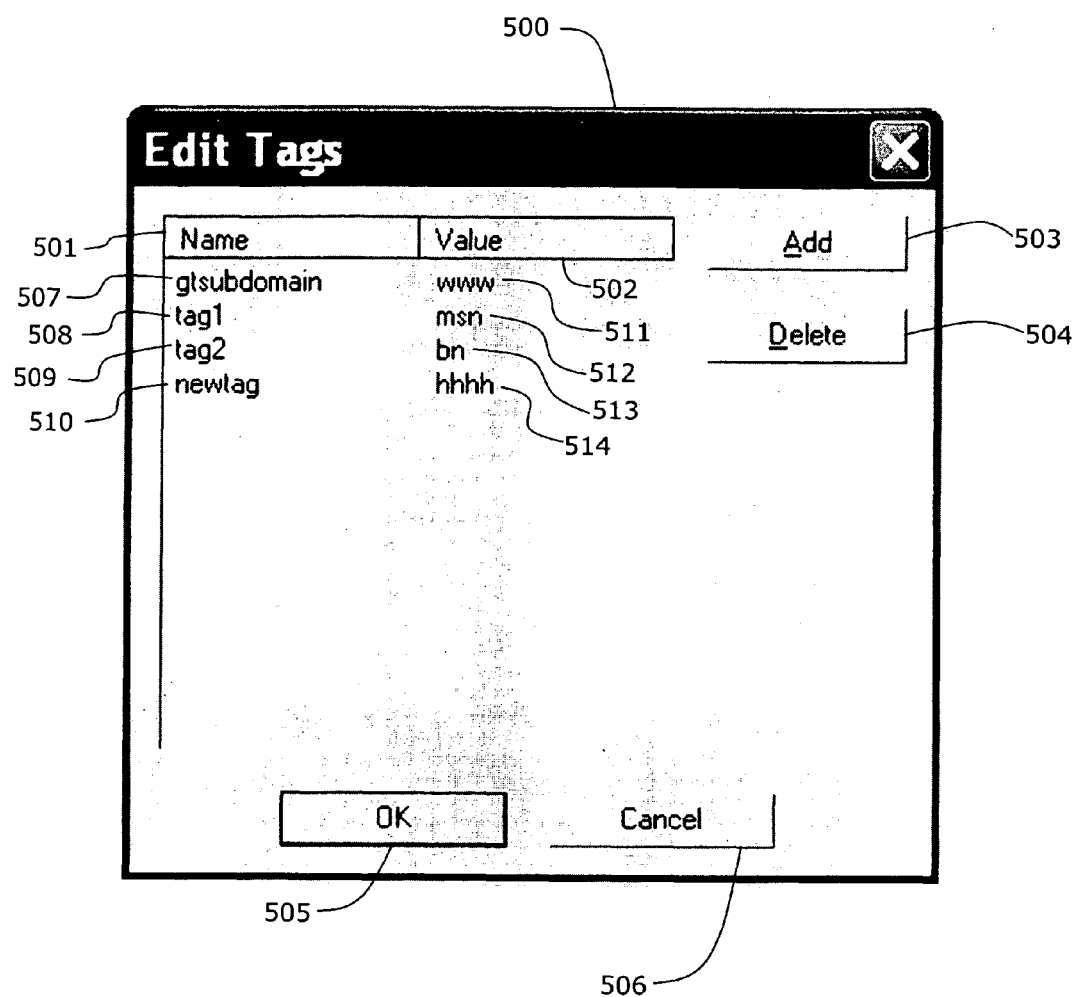
FIG. 6A is a view of a dialog box from a load testing application with sample entries according to some embodiments of the present invention.
Figure 6B:
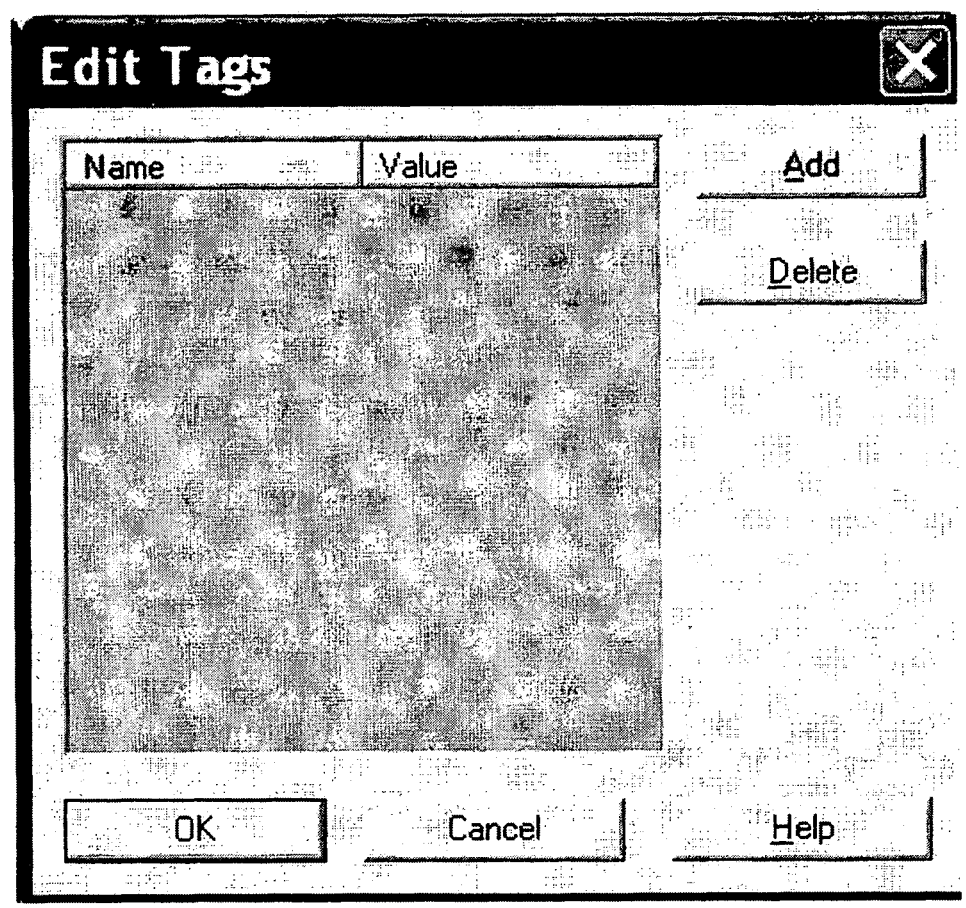
FIG. 6B is a view of a blank dialog box from a load testing application according to some embodiments of the present invention

The tester may access the Edit Tags dialog box 500, as seen in FIGS. 6A-B, from the WebTest dialog box 200 by pushing the Tags button 214. The tags functionality allows the tester to insert a tagged value into a URL so that a particular portion of the URL can be varied, while maintaining all of the other aspects of the template, such as configuration parameters, parameter randomization selections, and so on. The tags are displayed in a Name column 501 and a Value column 502, which contain the names 507-510 which are paired with their values 511-514. The Add button 503 and the Delete button 504 allow for the addition and the deletion of tag name-value pairs. When the preferred tag name-value pair has been highlighted, the OK button 505 will select that tag and return the tester to the WebTest dialog box 200. The Cancel button 506 cancels the tag selection process and the URL template will not be altered.

The addition of tags allows for substitution of any particular portion of the URL during the running of a template. A tagged value will be the same for each iteration of the URL during the load test when that particular template is loaded. In contrast to parameter values which may be varied for each test URL generated, the tag value does not change during the course of the load test.

Figure 7:
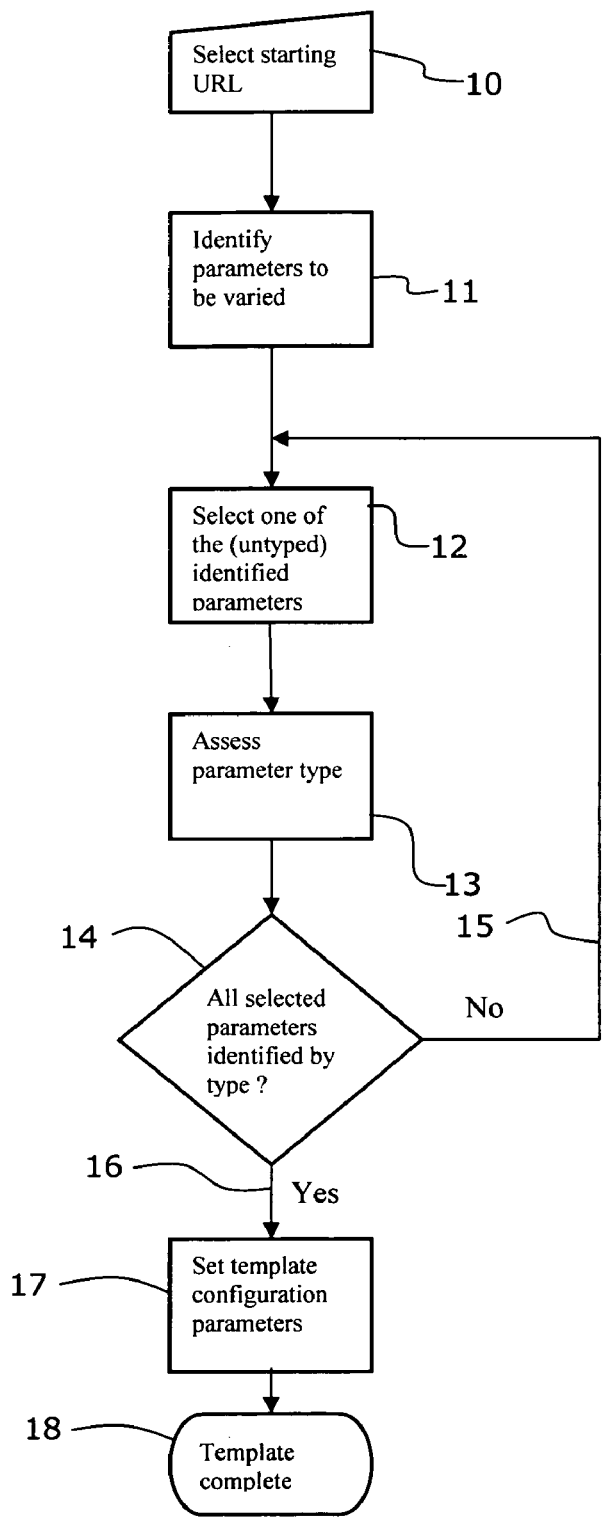
FIG. 7 is a flow chart illustrating the creation of a template according to some embodiments of the present invention.

In some embodiments of the present invention, a template is created to implement the functionality of randomly varying the value of one or more URL parameters, as seen in FIG. 7. The method of creating the template may be implemented using a computer based electronic system. The method may be implemented by a load testing application residing in a host computer in some embodiments. The method may be part of a load testing application residing upon a computer readable medium in some embodiments. The template may be used in the loading of a web-based application during a load test. In order to create a template according to this embodiment, the tester selects a starting Uniform Resource Locator (URL) 10. The URL selected typically consists of the following components: the protocol, the server, the port (often omitted), the directory, the application, and the URL parameters. The URL components are also summarized as protocol://machine address/path/filename. In the case of dynamic web pages, the URL parameters are selected prior to requesting the URL content object. Common use of web-based applications involves entering URL parameters as part of the use of or navigation through a web-based application. Although many web-based applications utilize Hypertext Transfer Protocol (HTTP), the present invention may be used with any of a variety of protocols. When displaying only the portion of the URL involving the web application and, for example, two parameters, the syntax may be as follows:

[URL webapp]?[parameter 1]&[parameter 2]

The selection 10 of the starting URL for a template is followed by review of the starting URL for identification of parameters to be varied 11. This review for identification of parameters to be varied is done by the tester in some embodiments. The review for identification of parameters to be varied is done automatically by the load testing application in some embodiments. The URL may have one or more parameters with variable values. In some embodiments, all of the parameters whose values are to be varied are identified at one time. After the identification of the parameters whose values are to be varied, one of the identified parameters is selected 12. The selected parameter is then assessed as to parameter value type 13. The assessment of a parameter for parameter value type is done by the tester in some embodiments. The assessment of a parameter for parameter value type is done automatically by the computer system in some embodiments, or in part by the tester and in part by the computer system. For example, the parameter value type may be text, a combination of text and numeric characters, numbers, binary data, symbolic characters, a sequence, or may be chosen to be more than one of the afore-mentioned types, or may be of another type, and may be of a certain quantity of characters. After identifying the parameter value type, particular ranges for the parameter values may also be set. For example, a numeric parameter value could be assigned a four digit value between 1000 and 5000. Also, a particular parameter value could be broken into sub-parts, with each sub-part assigned a parameter value type and a value range. After assessment of the parameter value type of the first selected parameter, a review 14 is made to check if all of the selected parameters have had their values assessed as to type. The process is repeated 15 if any remaining selected parameters have not been assessed as to parameter value type. This is repeated until all selected parameters are assessed as to parameter value type 16. In some embodiments, a parameter value is selected to be varied, and then assessed as to type before selecting another parameter. In some embodiments, all of the parameter values to be varied are selected, and then the selected parameters values are assessed as to type. A parameter template can be used to create URLs that are made up of any combination of static values and dynamic (random) values. One advantage of this method is that the tester can set up templates that send purposefully invalid URLs. This will allow for testing, for example, of how the application responds to such invalid requests.

The template configuration parameters are then set 17 in some embodiments of the present invention. The configuration parameters may use default values in some embodiments. The configuration parameters may include items such as the maximum allowed wait time for a response before proceeding to the generation of the next URL, the number of cycles to run the template, the amount of time to run the template, and other values. Once the template configuration values are set, the template creation process is complete 18.

In some embodiments of the present invention, the following syntax is used for inserting the random values for the selected parameter values:

```
Parameter-Template = "(" contents ")"
Contents = free-text | random-value
Random-value = token token-parameter
Token = s-token | or-token
s-token = "text" | "textnum" | "num" | "bin" | "symbol" | "seq"
or-token = "or" parameter-template parameter template
Token-parameter = value | range
Value = digit { digit }
Range = value "-" value
Free-text = { free-text-character }
Free-text-character = any-character-except-right-parentheses
```

The representative syntax seen above is used as an example of generating random values for a data item that is to be varied. In some templates, a plurality of parameters or parameter values of similar or different type are generated. The template creation as described above allows a tester to load test an application without the need to create any scripts. Also, no additional programming is necessary. In addition, this template can be developed without the need to scan application code.

In the syntax seen above, the syntax for varying a URL parameter includes a symbolic character opening the varying part of the parameter from the static part of the parameter. Then a command specifies how to vary the part selected to be varied. A plurality of arguments for this command are then included. A symbolic character then closes the varying part of the parameter. In the syntax defined above, the symbolic character opening the varying part may be a left parentheses, and the symbolic character closing the varying part may be a right parentheses.

Figure 8:
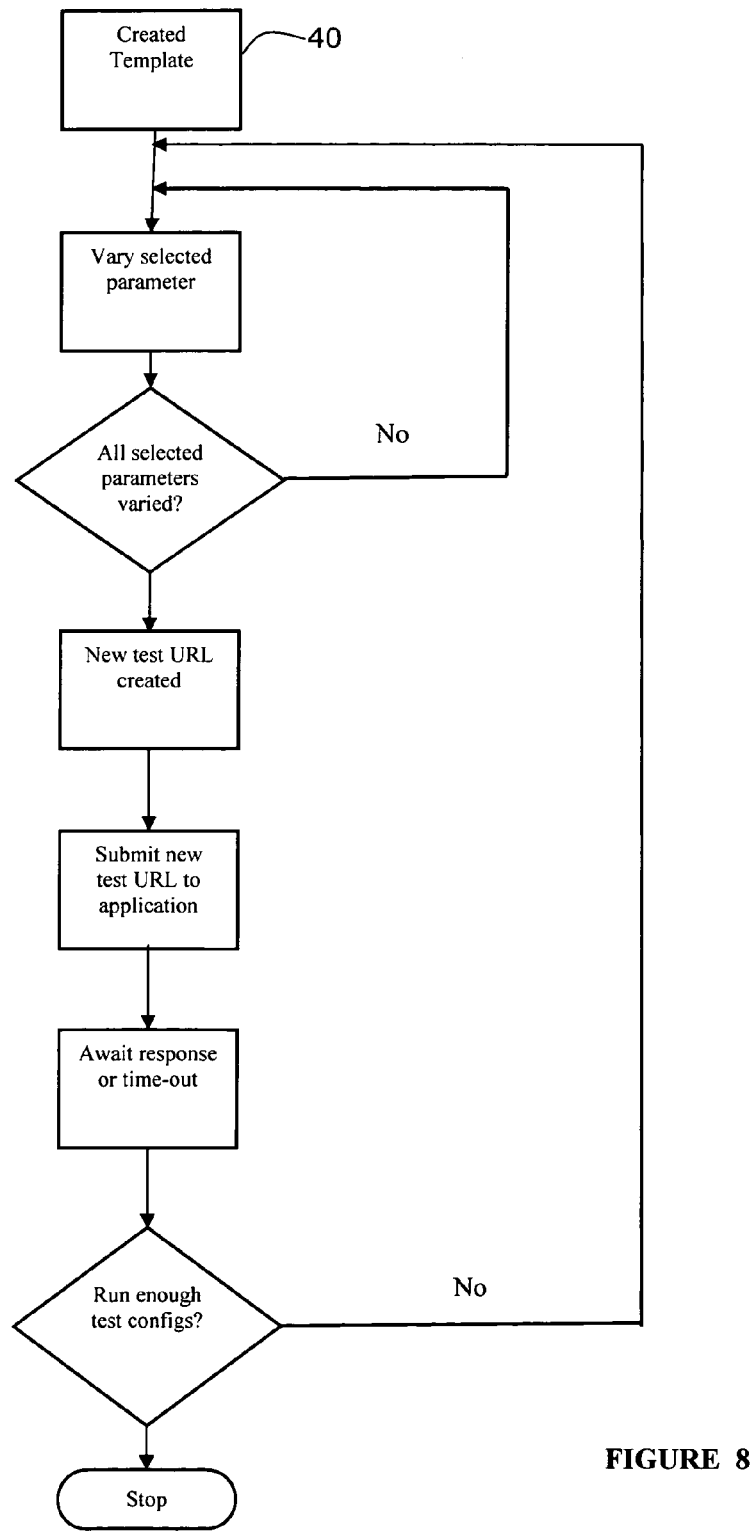
FIG. 8 is a flow chart illustrating the running of a template according to some embodiments of the present invention.

In some embodiments of the present invention, as seen in FIG. 8, a template is utilized to load a web-based application. The web-based application is or is part of a distributed internet application such as a web server, a cgi program, an application server configuration, a J2EE application, an ASP/COM based application, or any other type of application that serves users over the internet or other network. Beginning with a created template 40, the values of one of the selected parameters is varied 41 using the rules chosen during the creation of the template. The parameter values are varied using standard randomization algorithms according to the parameter type. If values of all of the selected parameters have not yet been varied 42, this step is repeated until all selected parameters have had their values varied 43. A new URL is created using the varied parameter values 44. The new URL is submitted to the web-based application 45. In some embodiments, the submission is done over a global-area computer network, such as the internet. In some embodiments, the submission is done over a local or wide area computer network.

In some embodiments, a template varies the values of the same parameters for the same starting URL repeatedly. In some embodiments, a load test runs a series of templates with different starting URL's and their varied parameter values and then repeats that series. In some embodiments, the different templates are set to run for different number of cycles, so one of the templates may finish its number of cycles before the end of the load test. The load test will then proceed running with the other templates until their completion.

After submission of the URL to the application, the process waits for a specific event 46, which can be a response from the application, a specified duration of time, or other event. In some embodiments, the specific event is the return of the content object requested. In some cases, the submitted URL will not return data from the server data store, and the returned content object will be a statement to that effect. In either case, the web-based application has been loaded by the load testing application. In some embodiments, the operation will time out after the elapsing of a pre-determined amount of time. In this case, the load test will proceed to the next step after this time period has elapsed.

After the specified event occurs, and if the configured number, or time duration, of submissions has not been run 47, the process repeats itself 48. During the next cycle, the URL parameter values are again varied, a new test URL with the varied parameter values is created, and this new test URL is submitted to the web application. If the configured number, or time duration, of submissions has been run 49, the running of the load test is complete 50.

Figure 9:
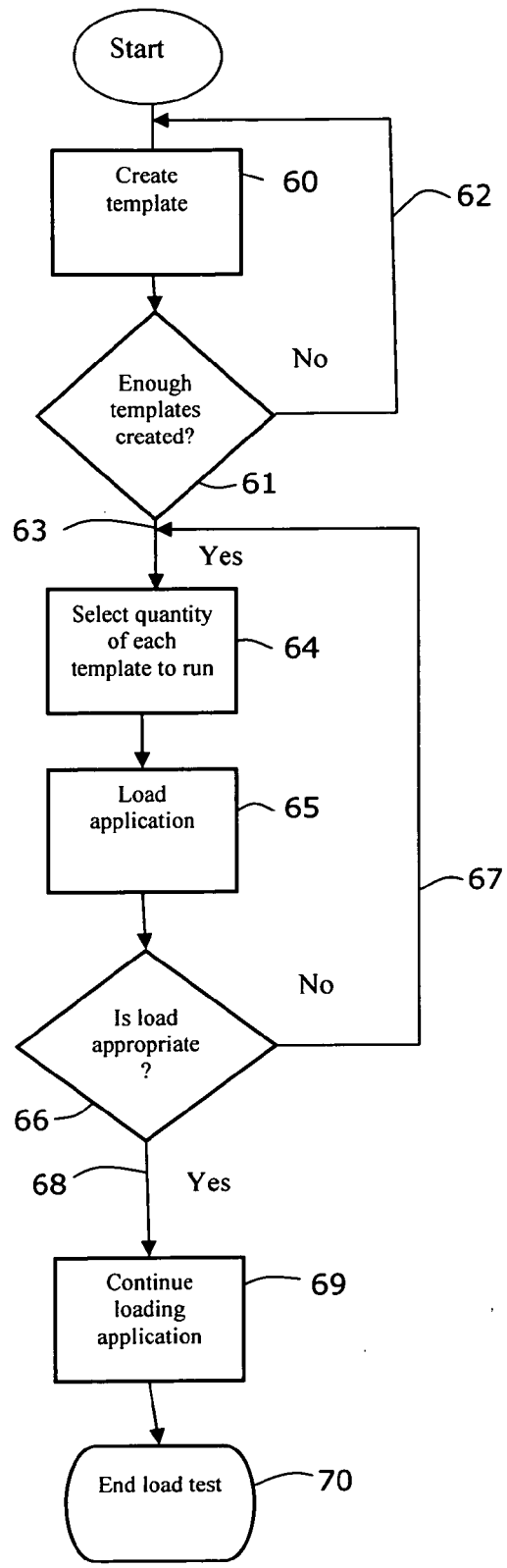
FIG. 9 is a flow chart illustrating a load test according to some embodiments of the present invention.

In some embodiments of the present invention, as seen in FIG. 9, the load testing of a web application is illustrated. The templates are created 60 according to the afore-mentioned method in some embodiments. The operator determines 61 if enough templates have been created. If enough templates have not been created 62, more templates will be created 60. If enough templates have been created 63, the operator selects the quantity of each template to run 64. In some embodiments, this selection is done automatically using an electronic system.

After the selection of the quantity of each template to run, the application is loaded 65. The loading is done by sending the modified URLs to the web-based application over a local connection, over a local area network, over a wide area network, or over global-area computer network such as the Internet. In some embodiments, the amount of time, or number of times, that the application is to be loaded is selectable after the selection of the templates. In some embodiments, the amount of time, or number of times, that the application is to be loaded has been previously selected during the creation of the template.

In some embodiments, the load test will be applied to the application while other performance measurements of the application are being made. In some cases, the load applied may not be the level of load desired by the tester. The tester may evaluated whether the load applied is appropriate 66, and if it is not the quantity of each template to be run may be re-visited 67. In some embodiments, the load test is run from a plurality of host computers. In some embodiments, the plurality of host computers may be simultaneously loading one or more web-based applications. In some embodiments, the quantity of each template to run may be adjusted without stopping the load test. In some embodiments, the load test may have to be stopped to modify the template quantities. If the load applied is appropriate 68, the application continues to be loaded 69. After the load test has run the pre-set time or the pre-determined number of cycles, the load test ends 70.

In some embodiments of the present invention, the computer-based method as described above is stored on a computer readable medium comprising instructions to implement some or all of the functionalities. The computer readable medium, when executed by a computer, causes the computer to perform the method as described.

Figure 10:
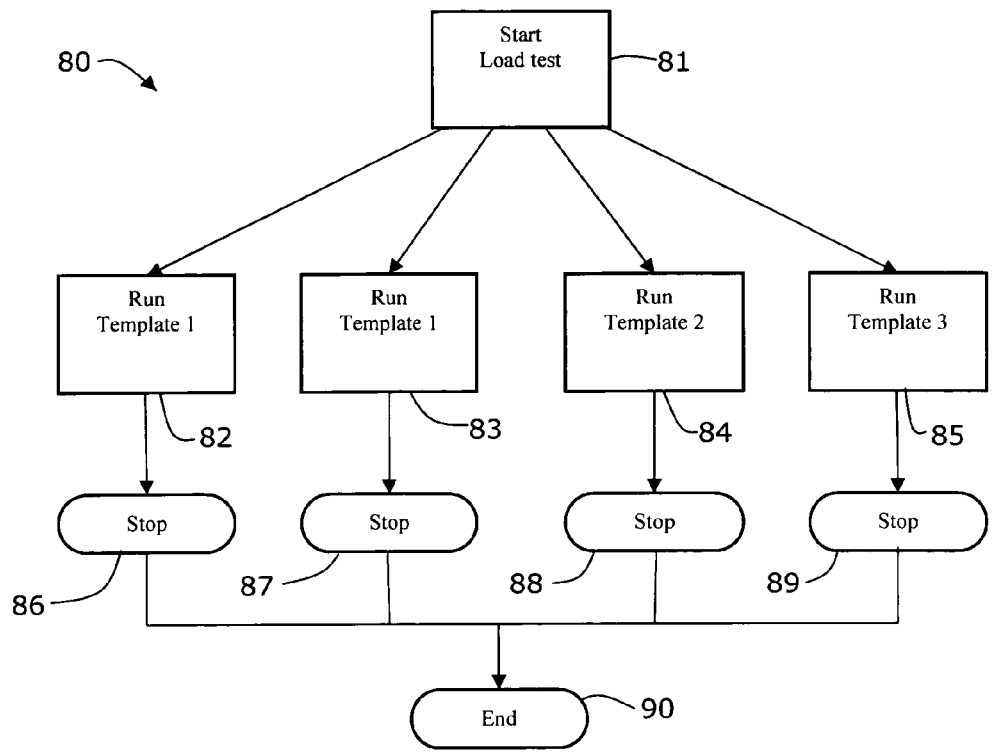
FIG. 10 illustrates a load test according to some embodiments of the present invention.

FIG. 10 illustrates a load test 80 according to some embodiments of the present invention. The load test is started 81, and this begins the running of the selected templates. In this example, template 1 is run 82, another template 1 is run in parallel 83, one of template 2 is run 84, and one of template 3 is run 85. Each template is run until its conclusion 86, 87, 88, 89. After the conclusion of the running of all of the templates, the load test is complete 90. In some embodiments, each of the templates run in parallel are run for the same amount of time. In some embodiments, each of the templates is run for a pre-set number of cycles or a pre-set amount of time that is separately set for each template.

Figure 11:
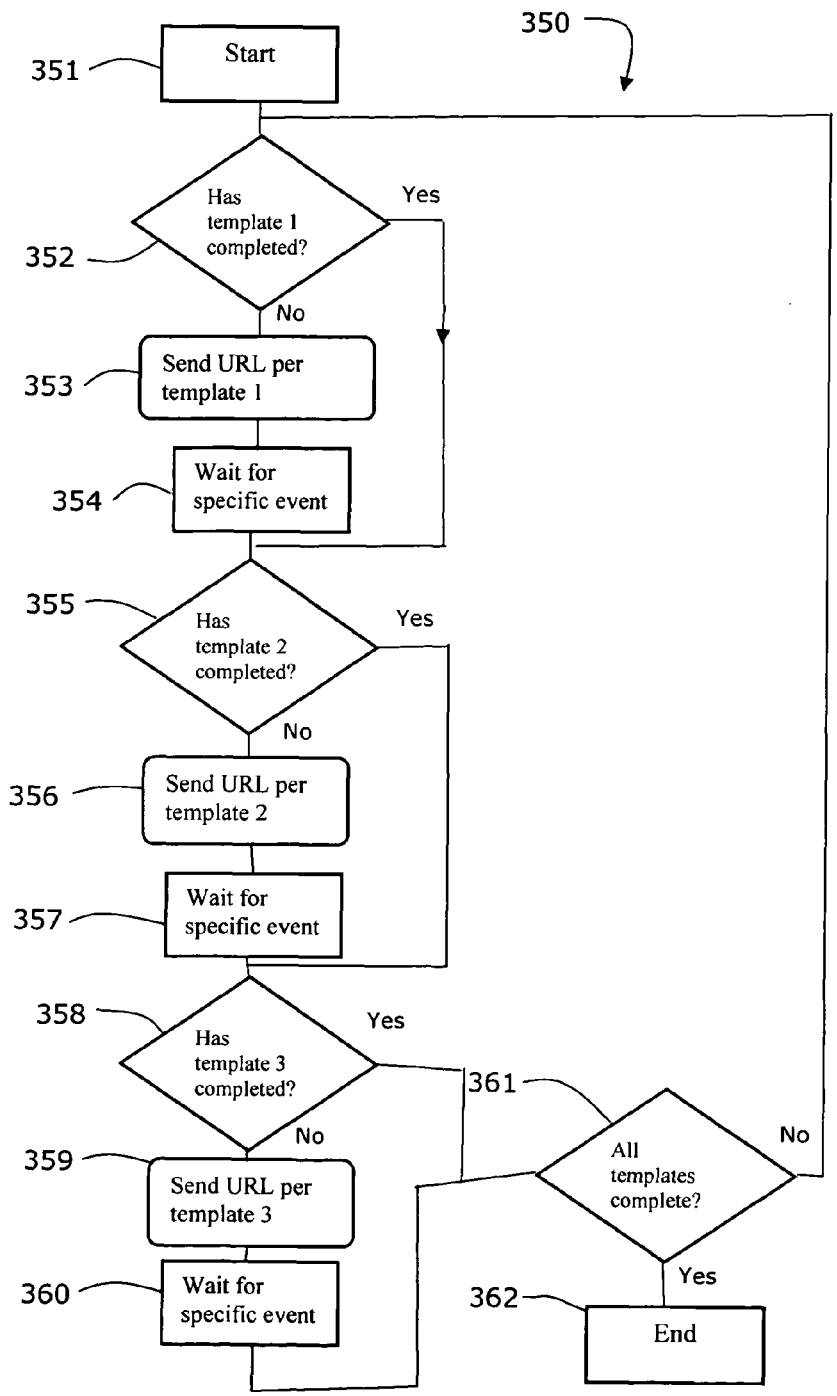
FIG. 11 illustrates a load test according to some embodiments of the present invention.

FIG. 11 illustrates a load test 350 according to some embodiments of the present invention. In this illustrative example, three templates are included as part of the load test. The load test is started 351, and the first template is checked 352 against the number of cycles set as its run limit. In some cases, no limit will be set on the number of cycles. In some cases, a limit will have been set for the number of cycles to run each of the templates. In some cases, the limits set for each of the templates will be different from one another. If the cycle limit for template 1 has not been reached, a test URL based on template 1 is created and sent 353. In some embodiments, a specified event is then waited for 354. This may be a return of data, the passage of a specified amount of time, or some other event. If the cycle limit for template 1 has been reached, use of template 1 is not made. Next, template 2 is evaluated as to the number of cycles it has run 355. If the cycle limit for template 2 has not been reached, a test URL based on template 2 is created and sent 356. In some embodiments, a specified event is then waited for 357. If the cycle limit for template 2 has been reached, use of template 2 is not made. Next, template 3 is evaluated as to the number of cycles it has run 358. If the cycle limit for template 3 has not been reached, a test URL based on template 3 is created and sent 359. In some embodiments, a specified event is then waited for 360. If the cycle limit for template 3 has been reached, use of template 3 is not made. This process repeats itself until the cycle limit for all of templates is reached 361 and then the test is at an end 362.

The foregoing description assumes a set of URL parameters to be submitted through a URL. In http-terms, this is known as the GET method. The mechanism can easily be used with the POST method. Using POST, the data submitted may or may not have URL parameters, in the same format as GET does, that is, using name-value pairs. Whether the posted data contains name-value pairs or not, the same approach can be used to vary any part of the URL or data. The same is true when using the PUT http method. Any TCP data, UDP data, or data submitted to a server using any other protocols can be varied using this mechanism.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

I claim:

1. A computer system for load testing, the computer system comprising:
   a first computer connected to a network;
   a computer program, embedded in a non-transitory computer-readable medium, executed by the first computer, the computer program comprising instructions for:
      assessing web instances running on one or more web browsers running on the first computer; and
      listing some or all of the assessed web instances for selection by a user of the computer system,
      wherein said instructions for assessing web instances running on one or more web browsers comprises instructions for:
         connecting to a web browser shell interface of a web browser running on the first computer;
         listing shell instances running on the web browser shell interface;
         determining if each of the shell instances support a COM interface; and
         listing the shell instances that support the COM interface.

2. A computer system for load testing, the computer system comprising:
   a first computer connected to a network;
   a computer program, embedded in a non-transitory computer-readable medium, executed by the first computer, the computer program comprising instructions for:
      automatically cataloguing web instances currently running on one or more web browsers running on the first computer;
      listing some or all of the catalogued web instances for selection by a user of the computer system;
      allowing a user to select one or more of the listed web instances as a test case URL;
      displaying parameter values of the selected test case URLs; and
      allowing the user to select one or more parameters whose values are to be varied within the selected test case URLs;
      wherein said instructions for varying the values of the selected parameters utilize syntax, wherein said syntax comprises:
         a symbolic character opening a varying part from a static part;
         a command that specifies how to vary the varying part;
         a plurality of arguments to the command; and
         a symbolic character closing the varying part.

3. The computer system of claim 2, wherein said symbolic character opening the varying part from the static part is left parentheses, and wherein said symbolic character closing the varying part is right parentheses.

* * * * *